(12) United States Patent
Yamashita

(10) Patent No.: US 6,539,800 B2
(45) Date of Patent: Apr. 1, 2003

(54) WHEEL SPEED SENSOR-MOUNTING STRUCTURE FOR DRUM BRAKE

(75) Inventor: Tadashi Yamashita, Nagoya (JP)

(73) Assignee: Nisshinbo Industries, Inc., Tokyo (JP)

( * ) Notice: Subject to any disclaimer, the term of this patent is extended or adjusted under 35 U.S.C. 154(b) by 28 days.

(21) Appl. No.: 09/815,448

(22) Filed: Mar. 22, 2001

(65) Prior Publication Data

US 2002/0007675 A1 Jan. 24, 2002

(30) Foreign Application Priority Data

Mar. 24, 2000 (JP) ........................ 2000-084847

(51) Int. Cl.[7] .............. G01P 1/02; F16D 65/56
(52) U.S. Cl. ............ 73/493; 29/525.01; 188/73.34
(58) Field of Search ............ 73/493, 494, 866.5; 29/525.01; 384/448; 324/207.25; 188/71.1, 72.7, 72.8, 72.9, 73.1, 73.2, 73.31–73.37

(56) References Cited

U.S. PATENT DOCUMENTS

| 5,308,171 A | * | 5/1994 | Sakamoto ............. 324/207.25 |
| 5,366,046 A | * | 11/1994 | Klane ................... 188/71.6 |
| 5,398,999 A | * | 3/1995 | Last ...................... 301/6.1 |

FOREIGN PATENT DOCUMENTS

| JP | 1-178242 | 12/1989 |
| JP | 8061400 | 3/1996 |
| JP | 8210396 | 8/1996 |
| JP | 10044951 | 2/1998 |
| WO | WO96/03594 | 2/1996 |

* cited by examiner

Primary Examiner—Helen Kwok
(74) Attorney, Agent, or Firm—Seed IP Law Group PLLC

(57) ABSTRACT

A wheel speed sensor-mounting structure has a wheel speed sensor mounted on an attachment member fixed to a non-rotatable vehicular portion, such as a torque plate and a dust cover, by way of a fastener accessible from the outside of the drum brake.

13 Claims, 5 Drawing Sheets

WHEEL SPEED SENSOR-MOUNTING STRUCTURE FOR DRUM BRAKE

TECHNICAL FIELD

This invention relates to a wheel speed sensor-mounting structure for a drum brake.

BACKGROUND OF THE INVENTION

One known type of a conventional wheel speed sensor-mounting structure is illustrated in FIG. 7. The wheel speed sensor is utilized for an antilock brake system. The structure used in a publicly known duo two leading drum brake will now be described with reference to FIGS. 5–7.

A dust cover 11 closes a bell-house shaped opening of a brake drum (not shown) and is secured to a torque plate 10 on the reverse side thereof by means of shoe-holding pins 20, 21. Each of a number of bolts 30 are force fit through an attachment member, such as the torque plate 10 and/or the dust cover 11, to fix the attachment member to a non-rotatable vehicular portion. Each of the bolts 30 are received by a respective engagement hole 10a of the torque plate 10 at a central portion thereof. Threaded portions of the bolts 30 engage with the non-rotatable vehicular portion, such as an axle casing (not shown), to secure the attachment member thereto in generally coaxial alignment with one another.

In FIG. 5, a pair of wheel cylinders 40, 41 rigidly bolted to the torque plate 10 and dust cover 11 are opened at both ends thereof and also function as anchors for supporting brake shoes 50, 51, positioned between the wheel cylinders 40, 41, at both ends thereof.

The wheel cylinder 40 includes pistons 40a, 40b, while the wheel cylinder 41 includes pistons 41a, 41b. The pistons 40a, 41a are provided with respective manually-operated shoe clearance adjusting mechanisms. In addition, automatically-operated shoe clearance adjusting mechanisms are respectively disposed between the pistons 40a and 40b and between the pistons 41a and 41b. The structure and operation of these two types of the shoe clearance adjusting mechanisms, as well as brake actuation associated therewith, are described in details in published Japanese Utility Model Application Laid-Open No. 1-178242 filed by the present Applicant; therefore, further descriptions related thereto will be omitted.

The brake shoes 50, 51 are comprised of shoe rims 50a, 51a and shoe webs 50b, 51b fixed to form a T-shape in cross-section. The brake shoes 50, 51 also include linings 50c, 51c attached to the shoe rims 50a, 51a on outer peripheral surfaces thereof, respectively. The shoe webs 50b, 51b have respective elongated holes pierced at central portions thereof; and, the shoe-holding pins 20, 21, which extend upward from the torque plate 10, are loosely inserted through the elongated holes. Pairs of slotted nuts 22 screw onto the respective shoe-holding pins 20, 21, thereby permitting respective outer peripheral surfaces of the linings 50c, 51c to be aligned with an inner peripheral surface of the brake drum (not shown), and further holding the brake shoes 50, 51 between the pairs of nuts 22 so as to permit the brake shoes 50, 51 to be slidable in a brake-applying/brake-releasing direction.

The shoe-holding pins 20, 21 are adjusted in the manner described below. Since the upper and lower shoe-holding pins 20, 21 in FIG. 5 are adjusted in the same manner, only the upper shoe-holding pin 20 will be described with reference to FIG. 6. Initially, the slotted nut 22 closer to the torque plate 10 is set on the shoe-holding pin 20 to have a predetermined height from an attached surface of the dust cover 11 mounted to the non-rotatable vehicular portion. Then, the nut 22 is fixed in position by means of a cotter pin 23. Next, the brake shoe 50 is temporally placed on the nut 22 fixed on the shoe-holding pin 20. A second slotted nut 22 disposed on the opposite side of the shoe web 50b from the first slotted nut 22 is fully screwed in, and is then screwed out by a predetermined degree of rotation. In this state, the second nut 22 is fixed in position by means of a respective cotter pin 23, completing the manual operation. Shoe return springs 24, 24 are extended between the brake shoes 50, 51.

A wheel speed sensor 60 (FIGS. 6 and 7) for an antilock brake system (hereafter "ABS wheel speed sensor") includes a sensor body 61, a lead wire 62 extending from the sensor body 61 and a bracket 63 for retaining the sensor body 61 in position. As is well known, the ABS wheel speed sensor 60 senses a wheel velocity to control directional stability and steerability of a vehicle, and further to avoid full wheel locking, thereby providing shorter braking distance.

The lead wire 62 extends outside of the drum brake through the torque plate 10 and dust cover 11 and is connected to, e.g., an electronic control unit. The typically cast-molded bracket 63 disposed on the torque plate 10 has a small hole 63a for engaging with a projection 10b of the torque plate 10. In addition, a mounting bolt 64 is screwed into an internal thread 10c of the torque plate 10 through a mounting hole 63b of the bracket 63 from the inside of the drum brake. The bolt 64 fastens the bracket 63 to the torque plate 10 through a spring washer 65. In this state, a top end of the sensor body 61 is positioned to face an outer peripheral surface of a sensor wheel (not shown) with a predetermined gap. The sensor wheel (not shown) is able to rotate together with a rotating axle shaft (not shown).

However, there are problems associated with the above-described prior art wheel speed sensor-mounting structure.

In a drum brake assembly line, when the wheel speed sensor is assembled on the torque plate at either an initial or intermediate process of the assembling, there is a likelihood that the sensor body and lead wire will be damaged when the torque plate having the wheel speed sensor disposed thereon is transferred to subsequent processes, and/or when other components are assembled onto the torque plate.

Accordingly, it is desirable to mount the wheel speed sensor onto the torque plate at the final process of the assembling line. However, space availability for sensor installation is usually limited because of both an inner diameter of the brake drum and the engagement hole of the torque plate at the central portion thereof. In addition, the brake shoes stand in the way. As a result, the assembling sequence as mentioned above is difficult to realize.

For this reason, the brake shoes adjusted in position by means of the shoe-holding pins and the slotted nuts as previously described must be disassembled in order to mount the wheel speed sensor onto the torque plate. The brake shoes are then reassembled after the wheel speed sensor is mounted on the torque plate. Such a laborious operation is inefficient and involves a great deal of effort.

In view of the above, an object of the present invention is to provide a wheel speed sensor-mounting structure for a drum brake, designed to be assembled with significantly less effort, without detracting from qualities of the wheel speed sensor.

SUMMARY OF THE INVENTION

In a first aspect, a wheel speed sensor-mounting structure for a drum brake comprises: a wheel speed sensor disposed inside the drum brake on an attachment member fixed to a non-rotatable vehicular portion, the attachment member constituting part of the drum brake, the wheel speed sensor being mounted on the attachment member from outside of the drum brake.

In a second aspect of a wheel speed sensor-mounting structure, the wheel speed sensor bracket has an internal thread defined therein and the attachment member has a mounting hole. A mounting bolt is inserted into the wheel speed sensor through the mounting hole of the attachment member to secure the wheel speed sensor by threading engagement with the internal thread.

In a third aspect of a wheel speed sensor-mounting structure, the wheel speed sensor is formed integrally with a stem extending through the attachment member, and the stem is defined with an external thread. A mounting nut is secured to the stem in threading engagement with the external thread.

In a fourth aspect of a wheel speed sensor-mounting structure, the wheel speed sensor is formed integrally with a stem extending through the attachment member, and a compressed spring is provided between a distal end of the stem and the attachment member.

In a fifth aspect of a wheel speed sensor-mounting structure, a locking means is disposed between the wheel speed sensor and the attachment member for locking the wheel speed sensor against rotation as well as positioning the wheel speed sensor.

DETAILED DESCRIPTION OF THE PREFERRED EMBODIMENTS

Figure 1:
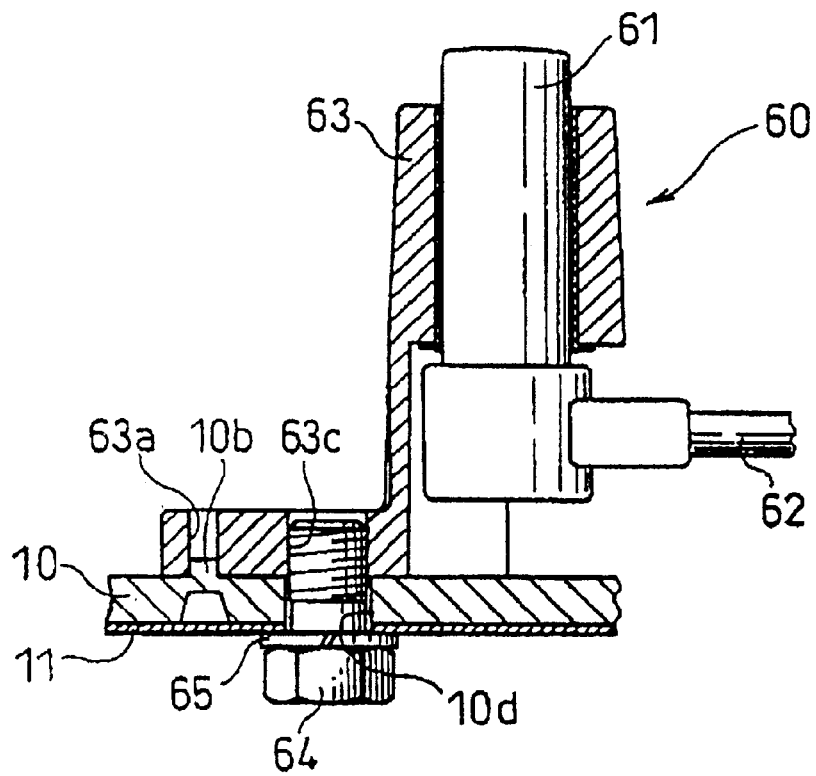
FIG. 1 is a longitudinal cross-sectional view, illustrating an ABS wheel speed sensor-mounting structure according to a first embodiment.

Embodiments of the present invention will now be described with reference to the drawings. The same reference numerals are hereinafter given for members identical in function to those described in the prior art; therefore, descriptions related thereto will be omitted.

FIG. 1 illustrates an ABS wheel speed sensor-mounting structure according to a first embodiment. As described below, the structure differs from that of the above-described prior art.

More specifically, a bracket 63 of the ABS wheel speed sensor 60 has an internal thread 63c formed therein, while a mounting hole 10d is pierced through an attachment member fixed to non-rotatable vehicular portion, such as a torque plate 10 and a dust cover 11. The wheel speed sensor 60 is mounted on the torque plate 10. Then, a mounting bolt 64 is screwed into the internal thread 63c of the bracket 63 from the outside of the drum brake through a spring washer 65. Thus, the wheel speed sensor 60 is rigidly secured to the torque plate 10 and dust cover 11.

Since the wheel speed sensor 60 can be assembled on the torque plate 10 as the final step of a brake-assembling process, there is a significantly reduced likelihood of the wheel speed sensor 60 being damaged. In addition, substantially less effort is required because the above structure eliminates the laborious operation in which brake shoes 50 are disassembled and then reassembled at the final step of the brake-assembling process as practiced in the prior art.

Similarly to the prior art, a projection 10b on the torque plate 10 and a small hole 63a in the bracket 63 are provided in the first embodiment. Although the projection 10b and the hole 63a are engaged with one another at a single location, the present invention is not limited thereto. For example, these two components 10b and 63a may be engaged together at two locations, while the hole 10d is used as an enlarged hole. The plural engagement of the projections 10b with the holes 63a locks the bracket 63 against rotation in order to provide precise positioning of the sensor body 61 when the bolt 64 is tightened up to the bracket 63. However, such a rotation-proof and positioning means is not necessarily required. Alternatively, for example, a jig may be used to position the sensor body 61 and to prevent rotation.

Figure 2:
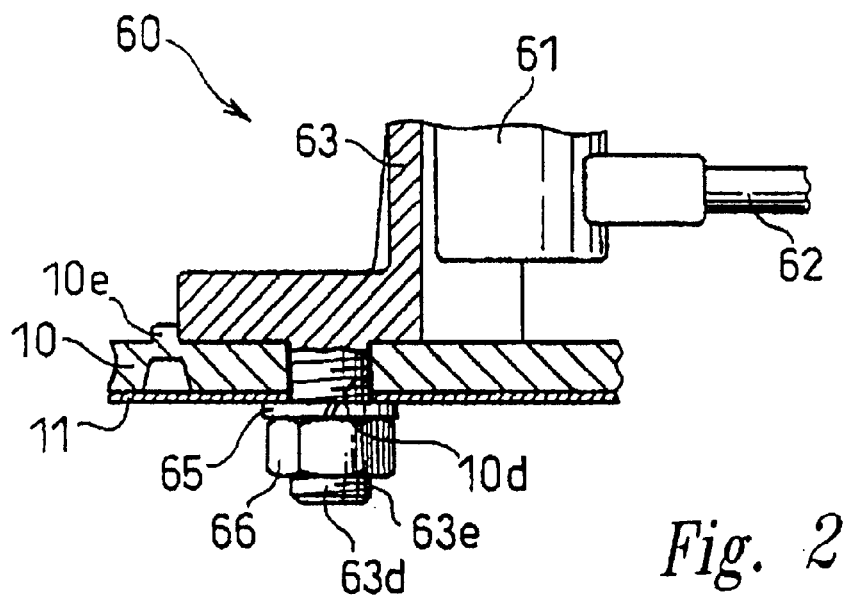
FIG. 2 is a longitudinal cross-sectional partial view, illustrating another ABS wheel speed sensor-mounting structure according to a second embodiment.

Another wheel speed sensor-mounting structure according to a second embodiment will be described with reference to FIG. 2.

A bracket 63, which is one part constituting an ABS wheel speed sensor 60, is formed integrally with a stem 63d. The stem 63d is positioned through the hole 10d that extends through both the torque plate 10 and the dust cover 11. The stem 63d is defined with an external thread 63e extending between a central portion of the stem 63d and a distal end thereof. A mounting nut 66 is disposed on the stem 63d, adjacent the spring washer 65, threadingly engaging the external thread 63e, allowing the tightening of the nut 66 on the stem 63d. The wheel speed sensor 60 is thereby mounted on the torque plate 10 and dust cover 11. As a result, the present embodiment provides effects substantially similar to those of the first embodiment.

Furthermore, the second embodiment provides a positioning structure that prevents rotation for the bracket 63 as a variation of in the structure of the first embodiment. More specifically, a rectangular projection 10e is provided on the torque plate 10; and, the bracket 63 has an outer end surface positioned against a side end surface of the projection 10e. Alternatively, a portion of the stem 63d without the external thread 63e (e.g., proximate portion) may be formed into any non-circular shape so as to be brought into fit with at least a portion of the hole 10d in the torque plate 10. As a result, the second embodiment provides another positioning structure for the wheel speed sensor 60 that prevents rotation.

Figure 3:
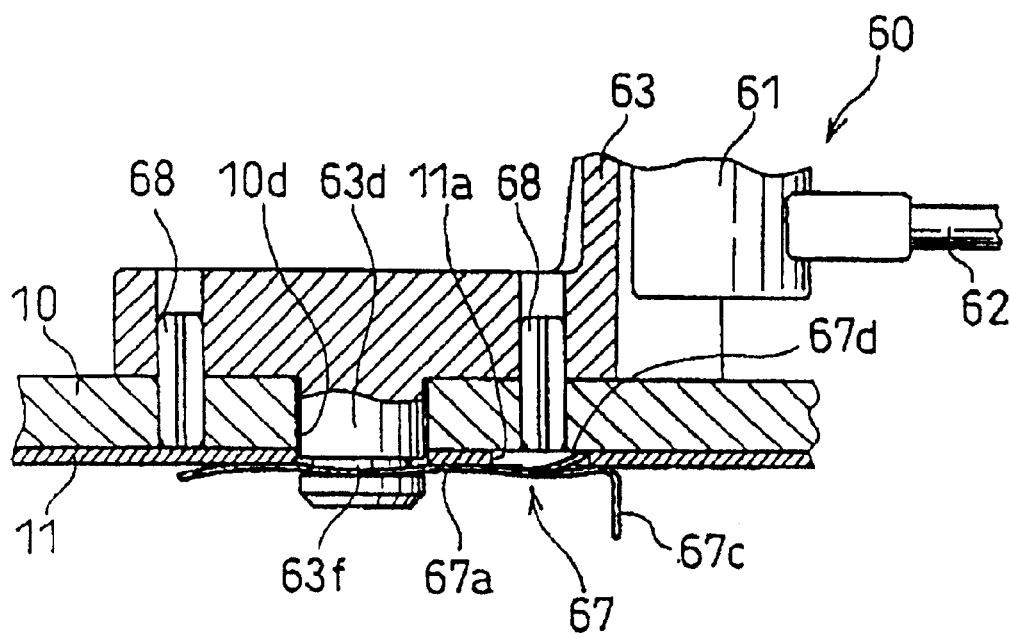
FIG. 3 is a longitudinal cross-sectional partial view, illustrating a further ABS wheel speed sensor-mounting structure according to a third embodiment.
Figure 4:
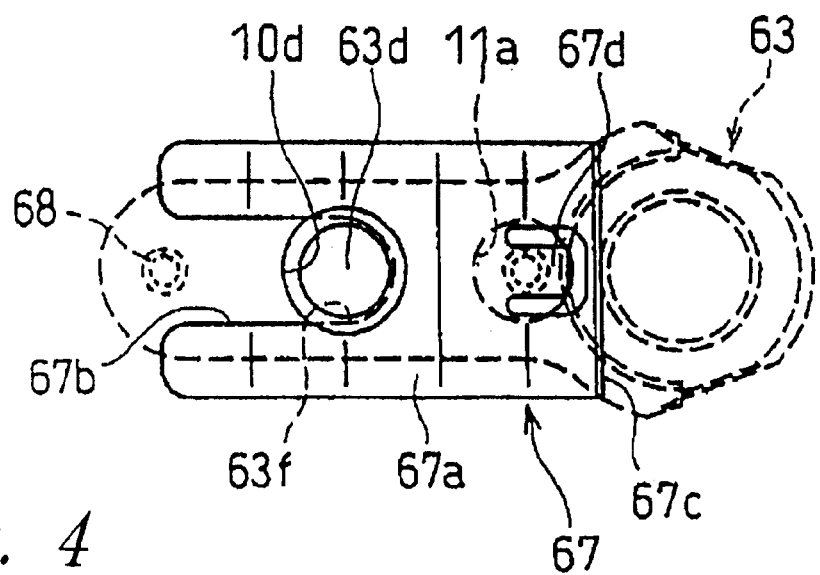
FIG. 4 is a bottom view, illustrating the underside of the structure in FIG. 3.
Figure 5:
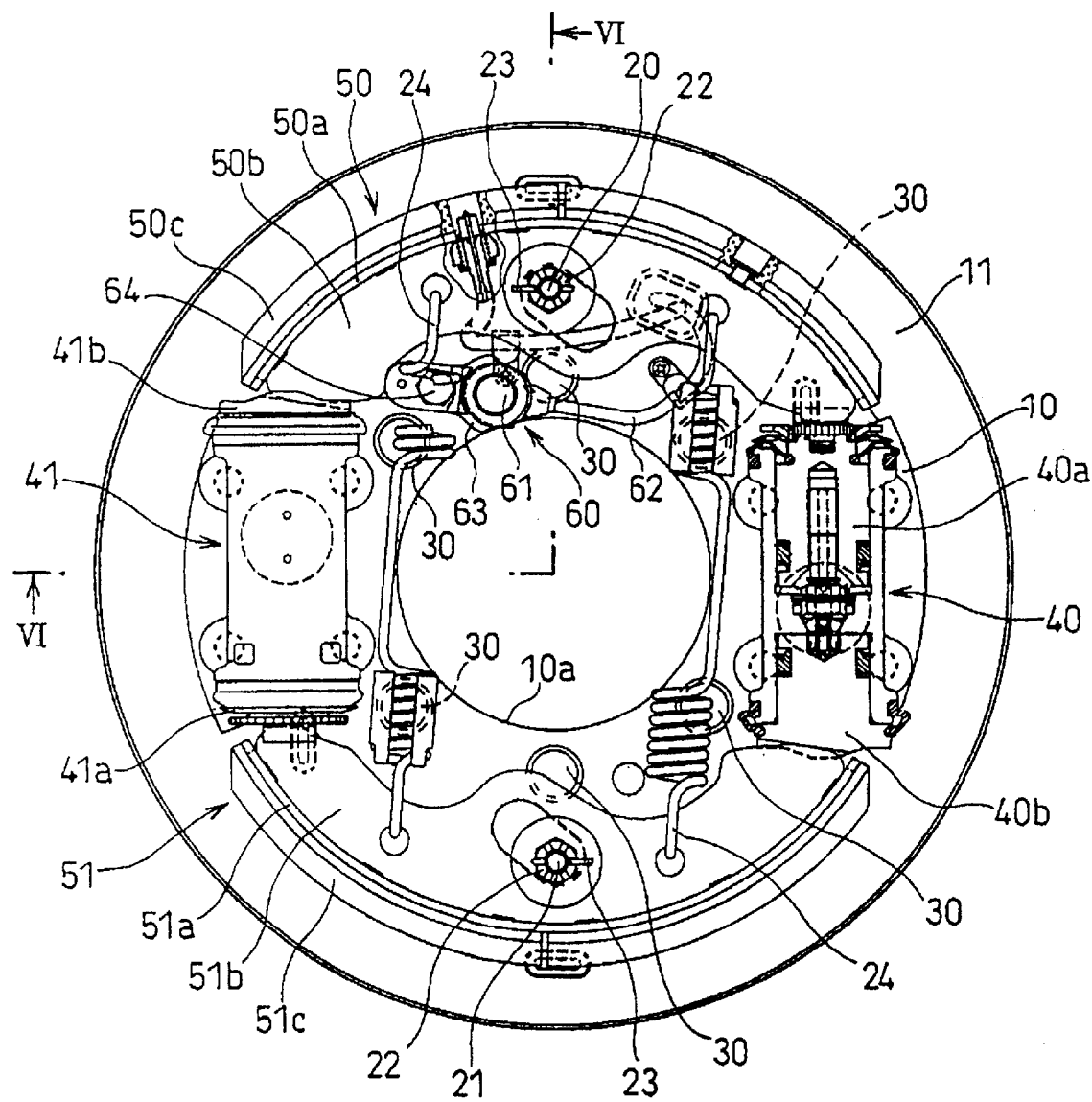
FIG. 5 is a front view, showing a conventional drum brake.
Figure 6:
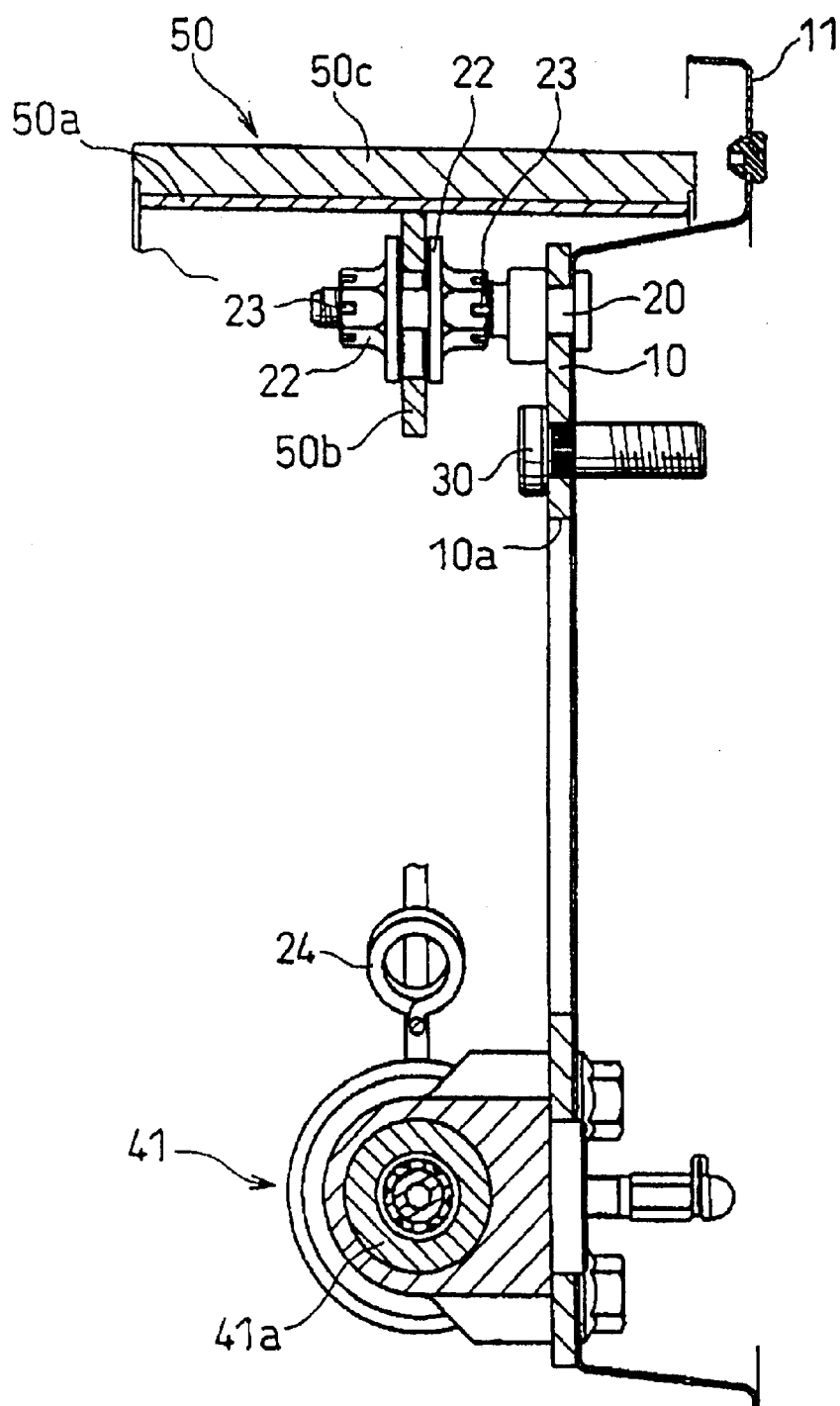
FIG. 6 is a cross-sectional view taken along line VI—VI of FIG. 5.
Figure 7:
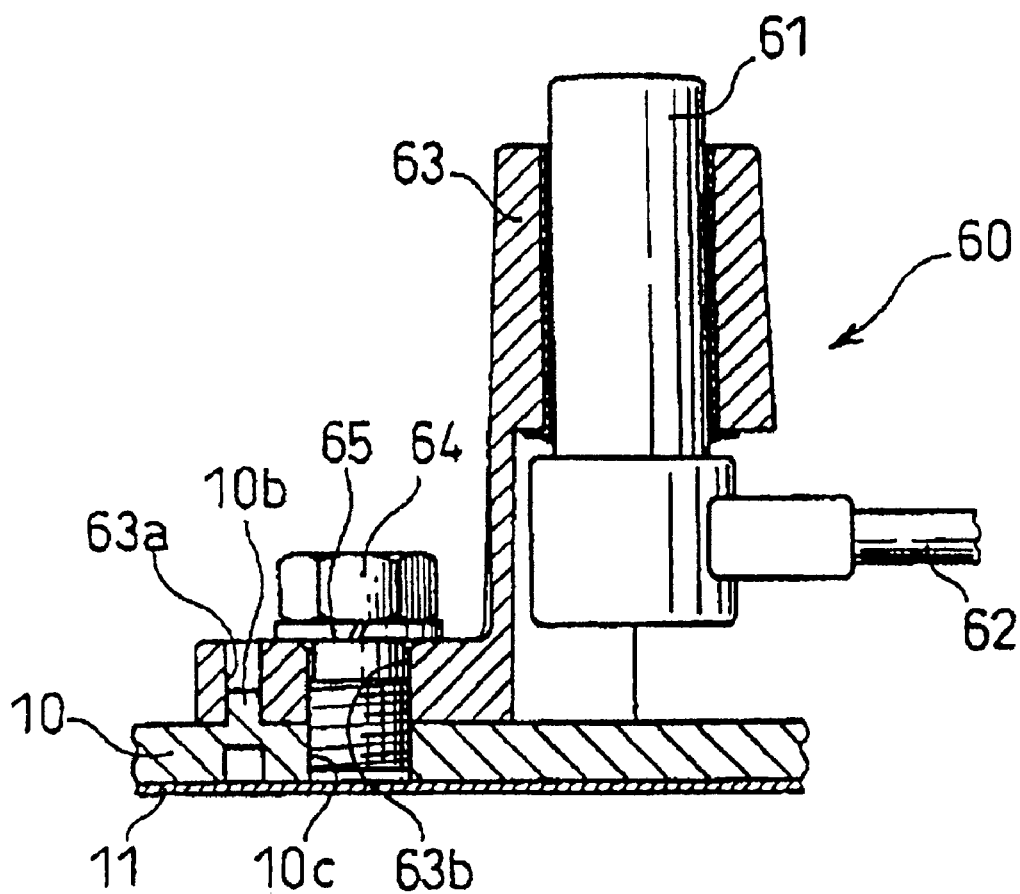
FIG. 7 is a longitudinal cross-sectional view, illustrating an ABS wheel speed sensor-mounting structure of FIG. 5.

A further wheel speed sensor-mounting structure according to a third embodiment will be described with reference to FIGS. 3 and 4.

A bracket 63, which is one part constituting an ABS wheel speed sensor 60, is formed integrally with a columnar stem 63d. The stem 63d extends through the circular hole 10d that is pierced through the torque plate 10 and the dust cover 11. The stem 63d is formed with an annular groove 63f adjacent to a distal end thereof. In addition, a biasing structure such as a compressed spring is disposed between the dust cover 11 and the annular groove 63f. The wheel speed sensor 60 is thereby mounted on the torque plate 10 and dust cover 11.

The spring can take the form of a leaf spring 67. The leaf spring 67 includes a waved main body 67a and a cutout 67b shown at the left in FIG. 4. The cutout 67b fits into the annular groove 63f. The leaf spring 67 has a pressing portion 67c shown at the right in FIG. 3. The pressing portion 67c is bent at a right angle in a direction in which a distal end of the pressing portion 67c is spaced apart from the dust cover 11. The leaf spring 67 can further include a tongue 67d formed adjacent to the pressing portion 67c. The tongue 67d extends in the opposite direction from the pressing portion 67c so as to engage an engagement hole 11a of the dust cover 11. The leaf spring 67 is assembled on the stem 63d by the steps of: bringing an opening edge of the cutout 67b into contact with the annular groove 63f; and, then pressing the pressing portion 67c so as to slide the leaf spring 67 until the opposite curved edge of the cutout 67b bumps against the groove 63f. As a result, the leaf spring 67 is resiliently positioned against the dust cover 11 at two locations where respective waveform tops of the leaf spring 67 are spaced apart from one another by a certain distance as shown in FIG. 3. In addition, the leaf spring 67 is resiliently positioned against a stepped surface of the annular groove 63f at a location between the two spaced-apart waveform tops of the leaf spring 67. The wheel speed sensor 60 is thereby mounted on the torque plate 10. Further, the tongue 67d engages the perimeter of the hole 11a, thereby resisting the leaf spring 67 accidentally disengaging. As a result, the third embodiment provides effects substantially similar to those in the first and second embodiments.

Furthermore, the present embodiment provides a positioning structure for the bracket 63 that prevents rotation as a variation of such a structure in the first and second embodiments. More specifically, the structure according to the third embodiment is a combination of two spring-type straight pins 68 and corresponding holes. The pins 68 extend from one of the torque plate 10 and bracket 63, while complimentary holes are provided in the other of the torque plate 10 and bracket 63. As an alternative, solid-type pins would replace one or more of the spring-type pins 68. As a further alternative, the annular groove 63f may be configured to have a width across the flat that engages the cutout 67b in a relatively non-rotatable manner. The tongue 67d also engages the hole 11a in a relatively non-rotatable manner. Additionally, the tongue 67d engages the hole 11a in such a manner as to be immovable in a direction in which the tongue 67d comes out from the hole 11a. The columnar stem 63d is held in fit with the circular hole 10d. In such a further alternative, these components cooperate with each other, thereby positioning the wheel speed sensor 60 while preventing rotation. As a result, the spring-type pins 68 can be eliminated.

In conclusion, the present invention may provide some of the following effects:

1. Since the wheel speed sensor can be assembled at the final step of the brake-assembling process, there is little possibility that the sensor body and lead wire may be damaged during the brake-assembling process.

2. Since the wheel speed sensor is mounted on the attachment member fixed to non-rotatable vehicular portion from the outside of the drum brake, related components can be laid out around the wheel speed sensor with a greater amount of freedom, even with a small-sized drum brake.

3. Since the steps of disassembling and reassembling the brake shoes for mounting the wheel speed sensor as practiced in the prior art are eliminated, the wheel speed sensor can be assembled with significantly less effort.

What is claimed is:

1. A wheel speed sensor-mounting structure for a drum brake comprising: a wheel speed sensor disposed inside said drum brake on an attachment member fixed to non-rotatable vehicular portion, said attachment member constituting part of said drum brake, said wheel speed sensor being mounted on said attachment member inside of said drum brake and secured on said attachment member by fastening means from outside of said drum brake.

2. A wheel speed sensor-mounting structure as defined in claim 1, wherein said wheel speed sensor has an internal thread defined therein, and a mounting hole being provided through said attachment member and a mounting bolt is inserted into said wheel speed sensor through said mounting hole to be secured to said wheel speed sensor in threading engagement with said internal thread.

3. A wheel speed sensor-mounting structure as defined in claim 1, wherein said wheel speed sensor is formed integrally with a stem extended through said attachment member, and said stem is defined with an external thread, a mounting nut being secured to said stem in threading engagement with said external thread.

4. A wheel speed sensor-mounting structure as defined in claim 1, wherein said wheel speed sensor is formed integrally with a stem extending through said attachment member, and a compressed spring is provided between a distal end of said stem and said attachment member.

5. A wheel speed sensor-mounting structure as defined in claim 1, wherein a locking means is disposed between said wheel speed sensor and said attachment member for locking said wheel speed sensor against rotation as well as positioning said wheel speed sensor.

6. A structure to mount a wheel speed sensor to a drum brake, comprising:
   a bracket carrying the wheel speed sensor;
   an attachment member forming a portion of the drum brake;
   a fastener coupling the bracket to the attachment member on an inside portion of the drum brake, the fastener having a user actuatable portion accessible from outside of said drum brake; and
   means for preventing rotation between the bracket and the attachment member.

7. The structure of claim 6 wherein the fastener comprises a bolt having a head and a threaded shaft, said attachment member forms a hole sized to receive the threaded shaft of the bolt, and the bracket forms a threaded receptacle sized for threadedly engagingly receiving the thread of the threaded shaft of the bolt.

8. The structure of claim 6 wherein the fastener comprises a nut having threaded opening, the bracket includes a stem extending therefrom having a thread outside of the stem sized to threadedly engage the threaded opening of the nut, and the attachment member forms a hole sized to receive the threaded stem.

9. The structure of claim 6 wherein the bracket includes a stem extending therefrom having an annular groove about a circumference thereof, the attachment member forms a hole sized to receive the stem of the bracket and the fastener comprises a biasing structure having a cut out sized to engage at least a portion of the annular groove of the stem and a portion engaging a portion of the attachment member.

10. The structure of claim 6 wherein the bracket and the attachment member each include at least one respective pin receptacle laterally offset from a longitudinal axis of the fastener; and further comprising:
   at least one pin receive by the respective pin receptacles of the bracket and the attachment member.

11. The structure of claim 6 wherein the bracket and the attachment member each include at least one respective engaging edge, the engaging edges laterally offset from a longitudinal axis of the fastener and sized and position to engage one another in a plane parallel to the longitudinal axis of the fastener.

12. The structure of claim 6 wherein the attachment member forms a hole for receiving a portion of the fastener, the hole having at least a portion that is non-circular, and a portion of the fastener that is received in the hole having shape that matches the non-circular portion of the hole.

13. A method of mounting a wheel speed sensor to a drum brake, comprising:
   coupling a body of the wheel speed sensor to a bracket;
   positioning the bracket and the wheel speed sensor on an inside of the drum brake;
   positioning a fastener through at least an hole in an attachment member; and
   actuating the fastener from outside of the drum brake to secure the bracket to the inside of the drum brake.

* * * * *